US007464341B2

(12) United States Patent  
Day et al.

(10) Patent No.: US 7,464,341 B2
(45) Date of Patent: Dec. 9, 2008

(54) CANCELING WINDOW CLOSE COMMANDS

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 11/171,774

(22) Filed: Jun. 30, 2005

(65) Prior Publication Data

US 2007/0006093 A1    Jan. 4, 2007

(51) Int. Cl.
*G06F 3/048* (2006.01)
(52) U.S. Cl. ...................................... 715/781; 719/318
(58) Field of Classification Search .................. 715/781; 719/318
See application file for complete search history.

(56) References Cited

U.S. PATENT DOCUMENTS

| 5,847,706 | A | * | 12/1998 | Kingsley ..................... 715/788 |
| 5,966,126 | A | * | 10/1999 | Szabo ......................... 715/762 |
| 6,084,967 | A | * | 7/2000 | Kennedy et al. ............. 380/247 |
| 6,950,993 | B2 | * | 9/2005 | Breinberg .................... 715/801 |
| 2003/0145060 | A1 | * | 7/2003 | Martin ........................ 709/207 |
| 2005/0120359 | A1 | * | 6/2005 | Shoji et al. .................. 719/321 |
| 2005/0257168 | A1 | * | 11/2005 | Cummins et al. ........... 715/809 |
| 2006/0106979 | A1 | * | 5/2006 | Toshine ....................... 711/112 |

OTHER PUBLICATIONS

Window Locking, Research Disclosure, Mar. 2002, p. 517, International Business Machines Corporation.
Improved IM Window Closing Behavior, The IP.com Journal, p. 80, v4n8.
Desktop Enhancement Tool: Icon Screensaver Theme Font Tool Download, http://www.tomload.com/desktop_enhancements, 2002-2004, Tom's Software Downloads Site, p. 1-2.
John A. Johnson, Go To Sleep! Fade To B/W, http://64.233.161.104/search?q=cache:-4wESOshv1sJ:www.codeproje..., 2003, pp. 1-7.

(Continued)

*Primary Examiner*—Stephen Hong
*Assistant Examiner*—Phenuel S Salomon
(74) *Attorney, Agent, or Firm*—Owen J. Gamon

(57) ABSTRACT

A method, apparatus, system, and signal-bearing medium that, in an embodiment, receive a close command directed to a window, and determine whether the close command was received within a close threshold time of the display of the window. If the close command was received within the threshold time, in various embodiments, a close dialog is displayed, the window is faded, the window is shrunk, or a status message is displayed indicating that the window is closing. If a cancel command is received within a cancel-close threshold, the closing of the window is canceled. If the number of times the cancel command has been received for the window exceeds a cancel threshold, then in various embodiments, the close threshold is increased, magnification is recommended, a sound option is recommended, or speech recognition is recommended. In an embodiment, in response to a close command directed to a window, a determination is made whether the number of times the window has been resized is greater than a resize threshold. If the window has been resized greater than the resize threshold, in various embodiments, the cancel dialog is displayed, the window is faded, the window is shrunk, or a status message is displayed indicating that the window is closing. In another embodiment, if input to a window has been received within an input threshold time since the window was opened, then a confirmation message is displayed.

17 Claims, 8 Drawing Sheets

OTHER PUBLICATIONS

Patent Application, U.S. Appl. No. 10/887,523 entitled "System for Locking the Closing of Windows," filed Jul. 8, 2004 by Patrick Laffey.

Patent Application, U.S. Appl. No. 10/912,499 entitled "System and Method for Reversing a Window Close Action," filed Aug. 5, 2004 by Susann Keohane et al.

* cited by examiner

| WINDOW ID | CLOSE THRESH | INPUT THRESH | RESIZE THRESH | RESIZE COUNT | CANCEL THRESH | CANCEL COUNT | CANCEL-CLOSE HIGH THRESH | CANCEL-CLOSE LOW THRESH |
|---|---|---|---|---|---|---|---|---|
| WORD PROCESSOR | 4 SECS | 5 SECS | 2 | 2 | 8 | 4 | 6 SECS | 2 SECS |
| INSTANT MESSAGING | 6 SECS | 4 SECS | 10 | 3 | 10 | 5 | 7 SECS | 3 SECS |

WINDOW DATA ~162

FIG. 5

CANCELING WINDOW CLOSE COMMANDS

FIELD

This invention generally relates to computer systems and more specifically relates to a user interface for closing windows.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

One of the most important developments in making computers not only more powerful, but easier to use, was the development of sophisticated user interfaces. Early computer systems were programmed with a series of switches or buttons and provided little relevant feedback during the operation of the computer system. This type of interface proved cumbersome and, accordingly, increasingly more functional and interactive interfaces were developed to extend the functionality of computer systems.

One very popular user interface, that ultimately gained widespread adoption on any different computer systems, was the "command line interface." Using a command line interface, the user interacted with the computer system by typing a specific command on a keyboard to instruct the computer regarding the desired operation to be performed. The command line interface was not intuitive, however, and still limited the use of computers to those who had the time and desire to learn a large number of relatively cryptic commands.

Recognizing the growing need for a more user-friendly interface, computer engineers and programmers developed the Graphical User Interface (GUI). A GUI uses visual representations of common items to allow a user to operate a computer system. In most GUI-based systems, various windows, icons, symbols, menus, etc. are manipulated or activated by a computer user via a pointing device (e.g., a keyboard, mouse, trackball, touchpad, trackpad, or speech recognition device), which allows the user to give instructions to the computer. The movement of the pointing device is usually translated to the movement of an animated arrow or cursor, displayed on the computer screen. By moving the pointing device, the user can position the cursor at various locations on the computer screen. Then, by activating a button on the pointing device, the user can invoke various commands and options on the graphical user interface.

Most graphical user interfaces make extensive use of windows. A window is usually, but not always, a rectangular portion of the display on a computer monitor that presents its contents seemingly independently of the rest of the screen. A window is typically manipulated by (1) opening and closing the window, e.g., by selecting an icon to start a program, (2) moving the window to any area of the screen by dragging (e.g., positioning the pointer over the window and moving the mouse or other pointing device with a button held down), (3) repositioning the window, so that the window appears to be behind or in front of other windows or objects on the screen, (4) adjusting the size (i.e., horizontal and/or vertical dimensions) and (5) scrolling to any section of the window contents, e.g., by using scroll bars along the bottom and right edges of the window, or by using a mouse wheel or keyboard commands.

The size of most windows can be adjusted over a wide range including full screen, a fraction of the screen, and more than the full screen. In the latter case, the desired section of the window can be viewed by moving the window to expose it. Windows can also be minimized, which results in their being replaced by an icon and/or their name, usually in a strip along the bottom of the screen, without actually closing the underlying application program. This flexibility is made possible by the various parts that can constitute a window. The parts of a window may include frames, vertical and horizontal scrollbars, drag strips (often along the top for dragging the entire window and along the other edges and lower corners for changing window size), buttons (for closing, maximizing and minimizing) and tabs (for moving among pages in a window).

Another feature of windows is the ability for multiple windows to be open simultaneously. This is particularly valuable in a multitasking environment, i.e., an operating system in which multiple programs can run seemingly simultaneously and without interfering with each other. Each window can display a different application, or it can display different files that have been opened or created with a single application.

Multiple open windows can be arranged with respect to each other in a variety of ways. They can be arranged so that they are contiguous and do not overlap (tiled windows) or so they do overlap (overlaid windows). Overlaid windows resemble a stack of documents lying on top of one another, with only the upper-most window displayed in full. Any window can be moved to the top of the stack and made the active window (i.e., ready for receiving user input) by positioning the pointer in any portion of it that is visible and clicking a mouse button. When applications are launched, they may open in a single window or multiple windows.

Various type of windows exist, and their functions and appearances can vary substantially. For example, child windows are windows that are opened either automatically or as a result of some user activity when using a parent window. They can range in functionality from the very simple to the full complement of controls. Message windows, also referred to as dialog boxes or pop-up messages are a type of child window. A dialog box is usually a small and very basic window that is opened by a program or by the operating system to provide information to the user and/or obtain information (or at least a response) from the user, including setting options or issuing commands.

Because the screen may contain so many windows, and because some windows may pop up or open unexpectedly, users are at risk for commands being carried out against unintended windows. For example, if the user issues a close command intended for a first window at approximately the same time that a second window unexpectedly pops up, opens, or launches, the close command may be unintentionally applied to the second window. If the user is watching carefully, the user might see a flicker of the second window before it closes, but the user might miss the second window entirely. The missed window might be an important calendar reminder for a meeting, or an urgent instant message from a supervisor, a customer, a coworker, or a family member, and the consequences of missing the window that was unintentionally closed might be severe.

Thus, there is a need for a better way to ensure that commands are applied against the intended window.

SUMMARY

A method, apparatus, system, and signal-bearing medium are provided that, in an embodiment, receive a close command directed to a window, and determine whether the close command was received within a close threshold time of the display of the window. If the close command was received within the threshold time, in various embodiments, a close dialog is displayed, the window is faded, the window is shrunk, or a status message is displayed indicating that the window is closing. If a cancel command is received within a cancel-close threshold, the closing of the window is canceled. If the number of times the cancel command has been received for the window exceeds a cancel threshold, then in various embodiments, the close threshold is increased, magnification is recommended, a sound option is recommended, or speech recognition is recommended. In an embodiment, in response to a close command directed to a window, a determination is made whether the number of times the window has been resized is greater than a resize threshold. If the window has been resized greater than the resize threshold, in various embodiments, the cancel dialog is displayed, the window is faded, the window is shrunk, or a status message is displayed indicating that the window is closing. In another embodiment, if input to a window has been received within an input threshold time since the window was opened, then a confirmation message is displayed. In this way, the user may be aided in sending commands or entering data to the intended window.

BRIEF DESCRIPTION OF THE DRAWINGS

Various embodiments of the present invention are hereinafter described in conjunction with the appended drawings:

FIG. 5 depicts a block diagram of example window data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
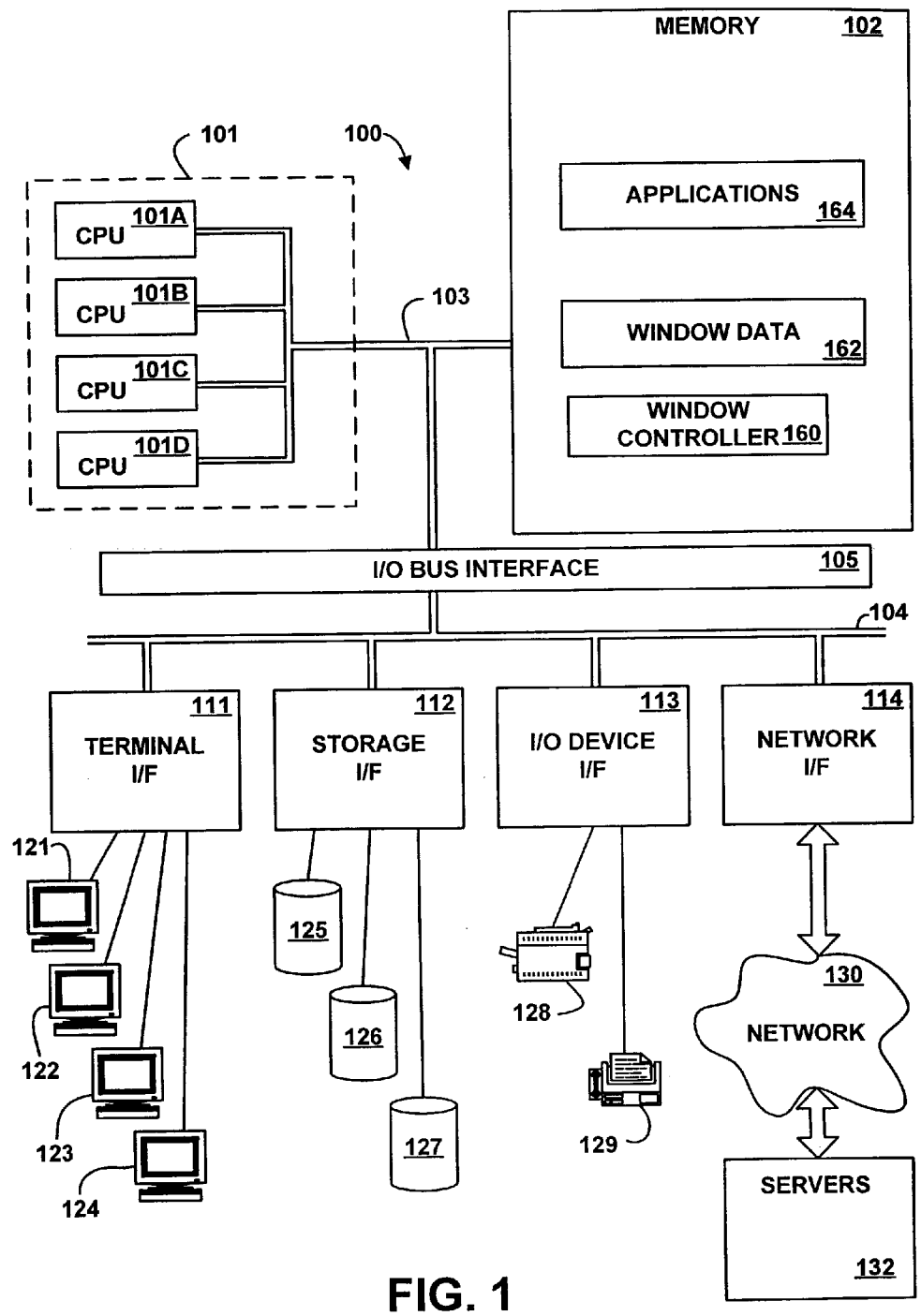
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to servers 132, according to an embodiment of the present invention. The terms "computer" and "server" are used for convenience only, and an electronic device that acts as a server in one embodiment may act as a client in another embodiment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a window controller 160, window data 162, and applications 164. Although the window controller 160, the window data 162, and the applications 164 are illustrated as being contained within the memory 102 in the computer system 100, in other embodiments some or all of them may be on different computer systems (for example, the servers 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the window controller 160, the window data 162, and the applications 164 are illustrated as being contained within the main memory 102, these elements are not necessarily all completely contained in the same storage device at the same time. Further, although the window controller 160, the window data 162, and the applications 164 are illustrated as being separate entities, in other embodiments some of them, or portions of some of them, may be packaged together.

The window controller 160 manipulates the closing of displayed windows associated with the applications 164 via the window data 162. In various embodiments, the window controller 160 may be an operating system, a portion of an operating system, an application, an application programming interface (API), a browser, a browser plug-in, or any other appropriate function. The window controller 160 includes instructions capable of executing on the processor 101 or statements capable of being interpreted by instructions executing on the processor 101 to perform the functions as further described below with reference to FIGS. 2, 3, 4, 5, 6, 7, and 8. In another embodiment, the window controller 160 may be implemented in microcode or firmware. In another embodiment, the window controller 160 may be implemented in hardware via logic gates and/or other appropriate hardware techniques in lieu of or in addition to a processor-based system. The window data 162 is further described below with reference to FIG. 5. The applications 164 may be any executable or interpretable code or statements or hardware logic capable of requesting the display of windows, including but not limited to an operating system, a user application, or a third-party application.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The servers 132 may include some or all of the hardware and/or software elements previously described above for the computer system 100. In another embodiment, the servers 132 are optional, not present, or not used.

It should be understood that FIG. 1 is intended to depict the representative major components of the computer system 100, the network 130, and the servers 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
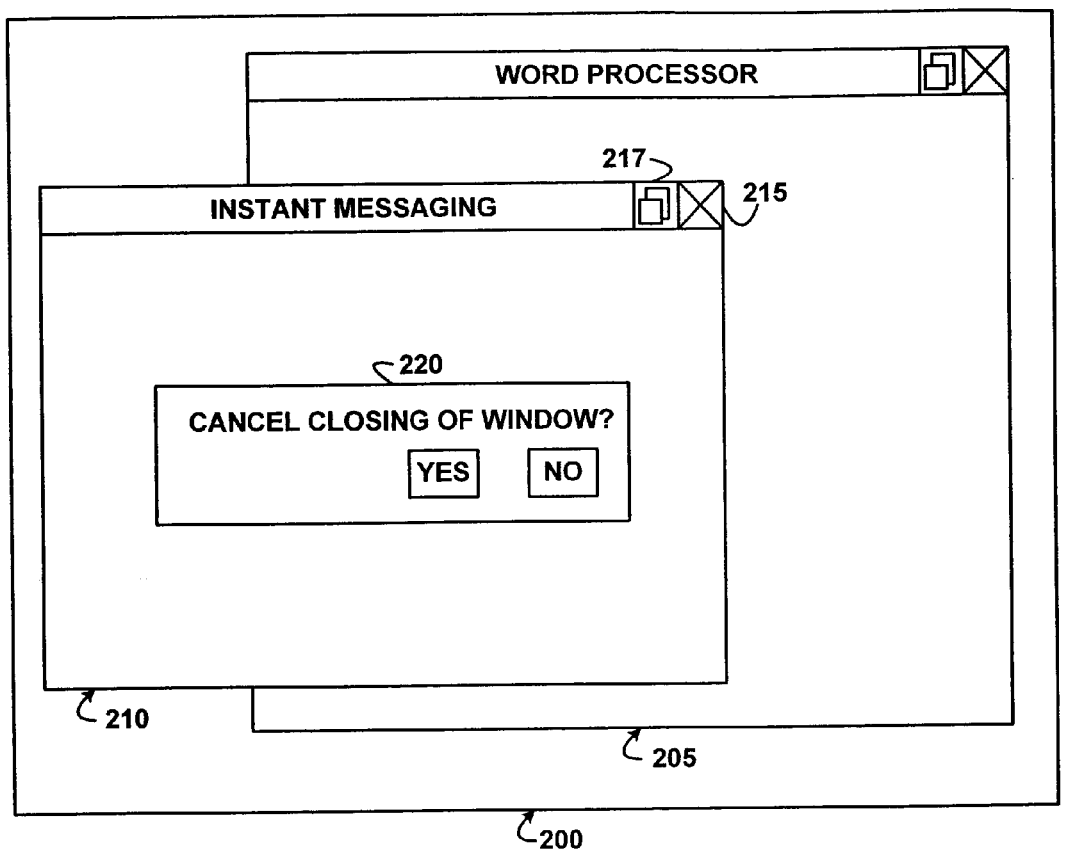
FIG. 2 depicts a block diagram of an example user interface with a cancel close dialog, according to an embodiment of the invention.

FIG. 2 depicts a block diagram of an example user interface 200 with a cancel close dialog 220, according to an embodiment of the invention. The example user interface 200 may be displayed on any or all of the terminals 121, 122, 123, or 124 (FIG. 1). The example user interface 200 includes windows 205 and 210, which are associated with the application 164. A window, such as a window 210, may be requested to be closed, either intentionally or inadvertently, by sending a close command to the window controller 160. The close command may be initiated via selection of the close icon 215, a menu option, a taskbar option, an escape key, or via any other appropriate technique.

In an embodiment, the window controller 160 displays the cancel close dialog 220 in response to receipt of a close command within a threshold amount of time from the display of the window 210 to which the close command was directed. The window controller 160 also may display the cancel close dialog 220 in response to the window 210 being resized a number of times that exceeds a resize threshold, as further described below with reference to FIG. 6. A window may be requested to be resized via selection of the resize icon 217, via grabbing and dragging a corner or border of the window with a pointing device, via double clicking within the window header, or via any other appropriate resizing technique. In various other embodiments, the window controller 160 may shrink or fade the window 210 in response to receipt of a close command within a threshold amount of time from the display of the window 210. The shrinking or fading may be in lieu of the cancel close dialog 220 or in addition to the cancel close dialog 220. In another embodiment, the window controller 160 may shrink or fade the window 210 in response to the window 210 being resized a number of times that exceeds a resize threshold. The window controller 160 shrinks the window 210 by reducing its size over time. The window controller 160 fades the window 210 by reducing its intensity over time, so that any windows or other objects behind the window become visible over time.

The cancel close dialog 220 gives the user the opportunity to request, e.g., via the "yes" option that the close operation directed to the associated window 210 be canceled. In another embodiment, the user may request that the close operation to be canceled via selecting the window 210, clicking in the window 210, clicking and holding in the window 210, double clicking in the window 210, or any other selection mechanism, as the window 210 is fading or shrinking away and before the window 210 totally closes or disappears. In various embodiments, in response to the cancel close command request, the window controller 160 stops the close operation and stops the fading or shrinking of the window 210.

Figure 3:
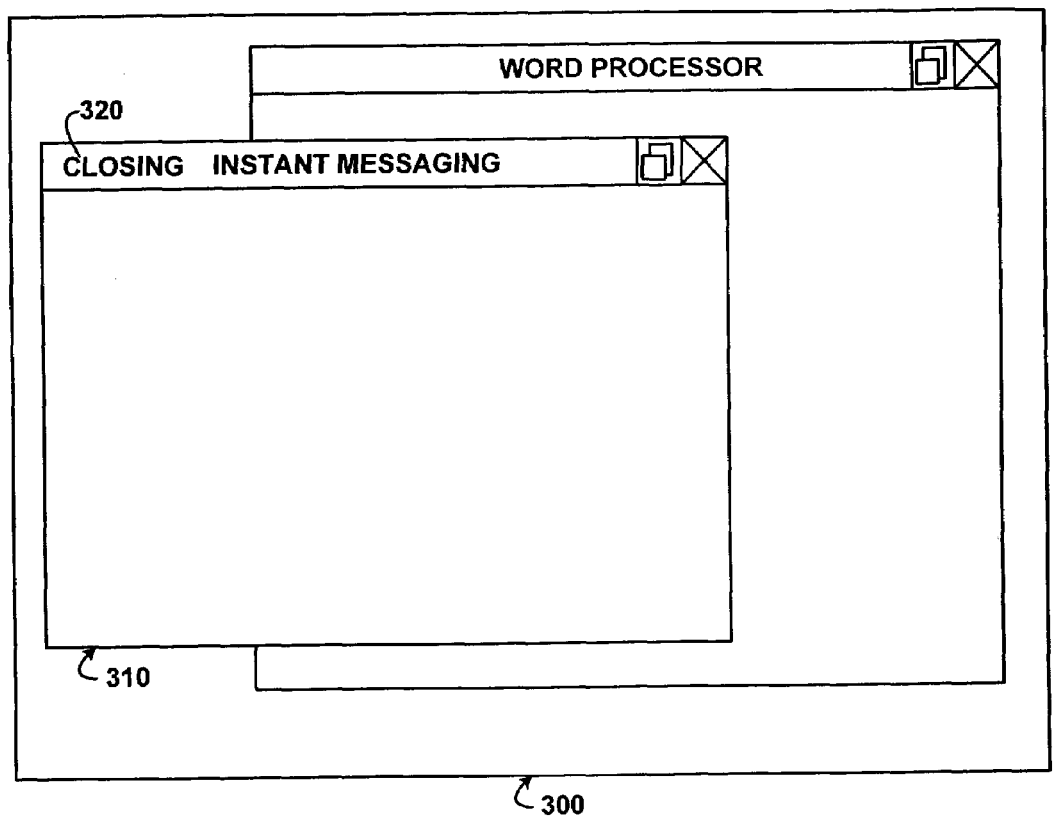
FIG. 3 depicts a block diagram of an example user interface with a status message, according to an embodiment of the invention.

FIG. 3 depicts a block diagram of an example user interface 300 with a status message 320, according to an embodiment of the invention. In an embodiment, the window controller 160 displays the status message 320 in response to receipt of a close command within a threshold of display of the window 310, as further described below with reference to FIG. 6. In another embodiment, the window controller 160 displays the status message 320 in response to the window 310 being resized a number of times that exceeds a resize threshold, as further described below with reference to FIG. 6. The status message 320 indicates that the window 310 is in the process of being closed. The status message 320 gives the user the opportunity to request that the close operation directed to the associated window 310 be canceled. In an embodiment, the window controller 160 may further fade or shrink the window 310, as previously described above with reference to FIG. 2. In various embodiments, the user may request that the close operation to be canceled via selecting the window 310, clicking in the window 310, clicking and holding in the window 310, double clicking in the window 310, or any other selection mechanism, as the window 310 is fading or shrinking away and before the window 310 totally closes or disappears. In various embodiments, in response to the cancel close command request, the window controller 160 stops the close operation.

Figure 4:
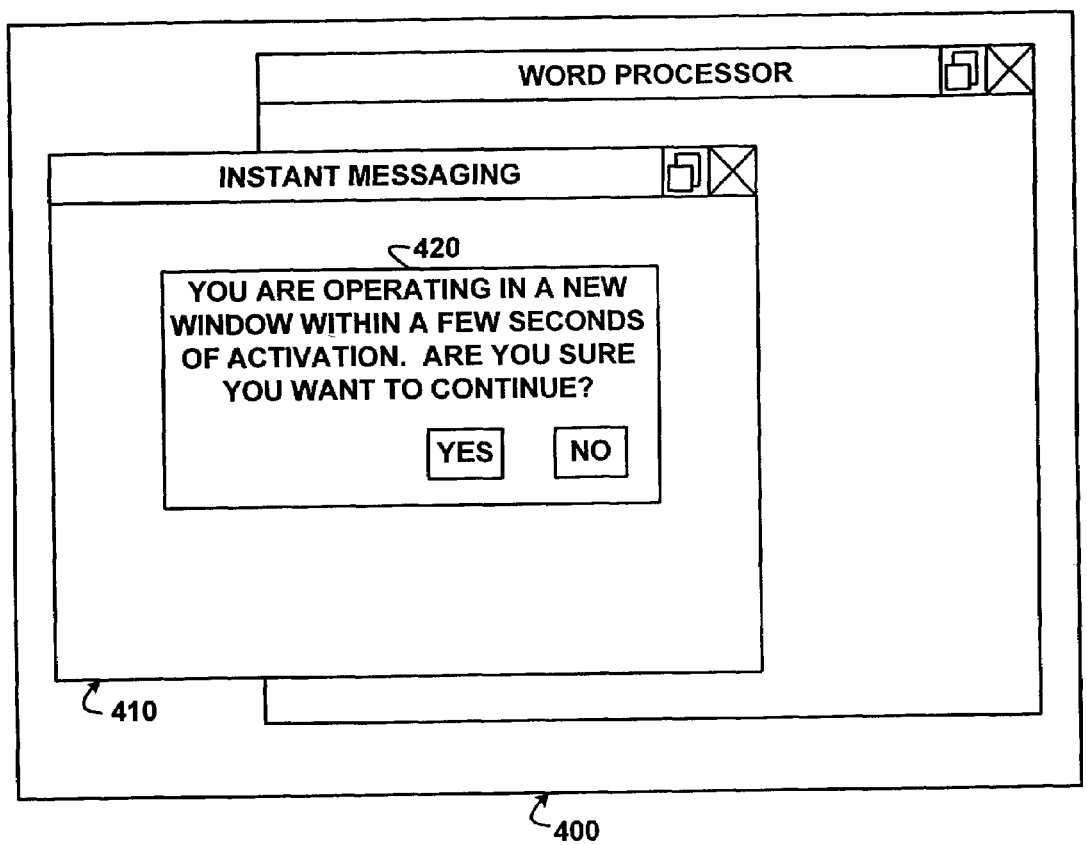
FIG. 4 depicts a block diagram of an example user interface with an input confirmation message, according to an embodiment of the invention.

FIG. 4 depicts a block diagram of an example user interface 400 with an input confirmation message 420, according to an embodiment of the invention. The window controller 160 displays the confirmation message 420 in response to receiving input directed to the window 410 within a threshold amount of time from activation, opening, or display of the window 410, as further described below with reference to FIG. 8.

The user interface elements, windows, arrangement of windows, and data illustrated in FIGS. 2, 3, and 4 are examples only, and in other embodiments, any number and type of user interface elements, windows, arrangement of windows, and data may be used.

FIG. 5 depicts a block diagram of example window data 162, according to an embodiment of the invention. The window data 162 includes records 505 and 510, but in other embodiments any number of records with any appropriate data may be present. Each of the records 505 and 510 includes a window identifier field 515, a close threshold time field 520, an input threshold time field 525, a resize threshold field 530, a resize count field 535, a cancel threshold field 540, a cancel count field 545, a cancel-close high threshold field 550, and a cancel-close low threshold field 555. In other embodiments, more or fewer fields may be present in the records.

The window identifier 515 identifies a window, such as the window 205, 210, 310, or 410. The close threshold time 520 indicates a threshold amount of time following opening of the window 515 with respect to the occurrence of a close window command. The input threshold time 525 indicates a threshold amount of time following opening of the window 515 with respect to inputting data to the window.

The resize threshold 530 indicates a threshold value of the number of times the window 515 has been resized, such as minimized, maximized, stretched, reduced, or otherwise had its dimensions changed. The resize count 535 indicates a current count of the number of times that the window 515 has been resized. The window controller 160 compares the resize count 535 against the resize threshold 530 as further described below with reference to FIG. 6.

The cancel threshold 540 indicates a threshold number of times that a close operation directed to the window 515 has been canceled. The cancel count 545 indicates a current number of times that a close operation directed to the window 515 has been canceled. The window controller 160 compares the cancel count 545 against the cancel threshold 540 as further described below with reference to FIG. 7.

The cancel-close high threshold field 550 indicates a high threshold value to be used with a timer that represents a long time period during which the user has the opportunity to request canceling the closing of a window via a cancel close command. The cancel-close high threshold field 550 is used by the window controller 160 to give the user a longer time (longer than the cancel-close low threshold 555) to cancel the closing of the window in scenarios when the likelihood is higher that the user will want to cancel the close. Such example scenarios include the window being closed has been open for a shorter amount of time (the close command was received within the close threshold 520) or the user has previously resized this window many times (the resize count 535 exceeds the resize threshold 530).

The cancel-close low threshold field 555 indicates a low threshold value to be used with a timer that represents a short time period during which the user has the opportunity to request canceling the closing of a window via a cancel close command. The cancel-close low threshold field 555 is used by the window controller 160 to give the user a shorter time (shorter than the cancel-close high threshold 550) to cancel the closing of the window in scenarios when the likelihood is lower that the user will want to cancel the close. An example scenario includes the window being closed has been open for a long amount of time (the close command was not received within the close threshold 520) and the user has previously resized this window a small number of times (the resize count 535 is less than or equal to the resize threshold 530). By selecting between the cancel-close high threshold 550 and the cancel-close low threshold 555, the window controller 160 selects the cancel-close threshold to use based on a likelihood that the cancel command will be received.

Although the window data 162 indicates separate records for each of the windows 515 with separate thresholds and counts, in other embodiments some or all of the windows 515 may share thresholds and/or counts.

Figure 6:
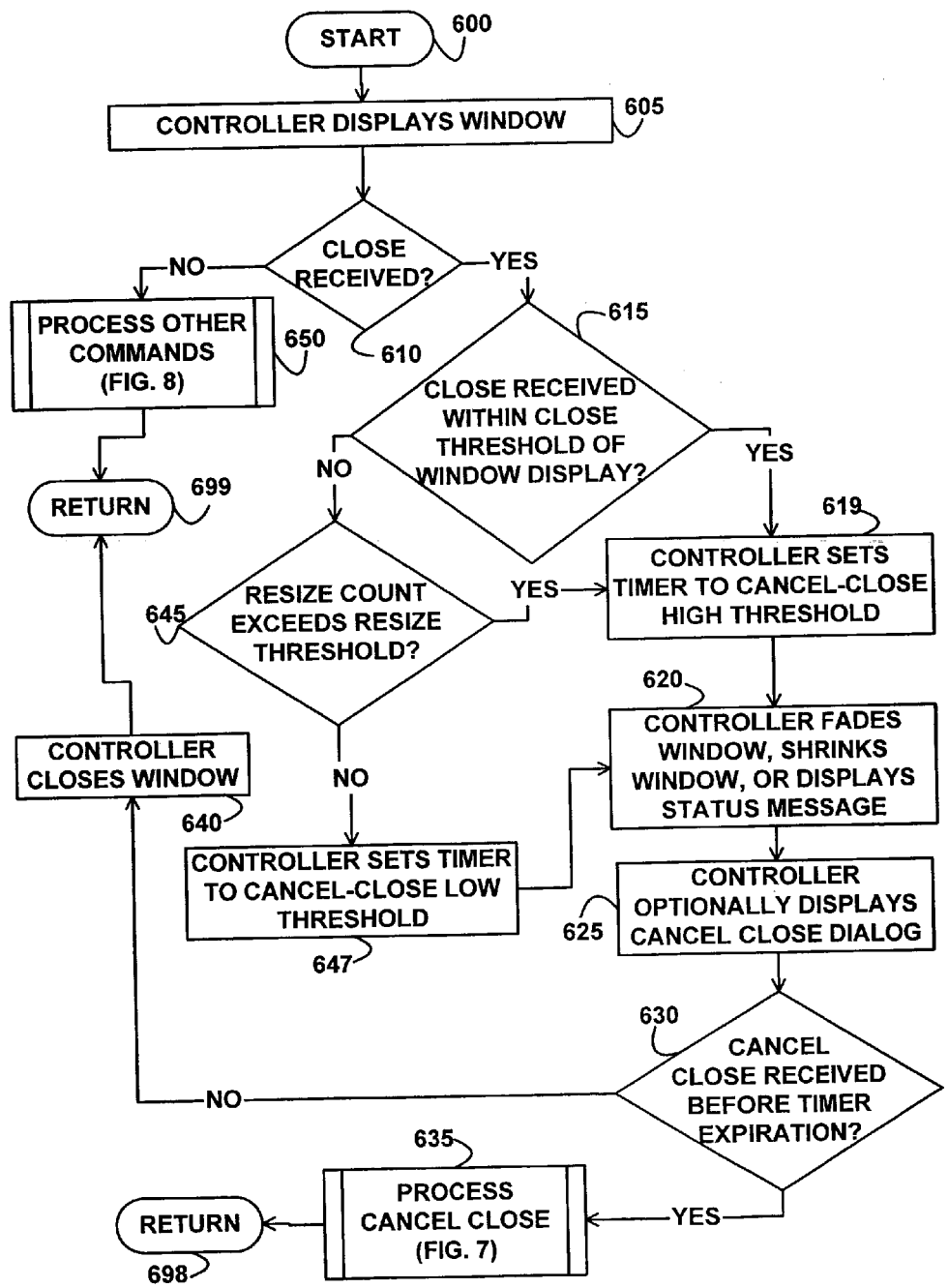
FIG. 6 depicts a flowchart of example processing for a close command, according to an embodiment of the invention.

FIG. 6 depicts a flowchart of example processing for a close command, according to an embodiment of the invention. Control begins at block 600. Control then continues to block 605 where the window controller 160 displays a window. Control then continues to block 610 where the window controller 160 determines whether a close window command has been received. If the determination of block 610 is true, then a close window command has been received, so control continues to block 615 where the window controller 160 determines whether the close window command was received within the close threshold 520 of the display of the window.

If the determination of block 615 is true, then the close window command was received within the close threshold time 520 of the display of the window, so control continues to block 619 where the window controller 160 initializes a timer to the value of the cancel-close high threshold 550. The window controller 160 uses the cancel-close high threshold 550 (as opposed to the cancel-close low threshold 555) at block 619 to give the user a longer time to send the cancel command because the likelihood is higher at this point that the cancel command will be received since the close was received within the close threshold 520 or the resize count 535 exceeds the resize threshold 530.

Control then continues to block 620 where the window controller 160 fades the window, shrinks the window, or displays the status message 320. Control then continues to block 625 where the window controller 160 optionally displays the cancel close dialog 220, offering to cancel the closing of the window. Control then continues to block 630 where the window controller 160 determines whether a cancel close command (in response to the cancel close dialog 220 or by selection of a shrinking window, fading window, or window with the status message 320) has been received prior to the expiration of the timer (previously initialized at block 647 or block 619). If the determination of block 630 is true, then the cancel close command has been received before expiration of the timer, so control continues to block 635 where the window controller 160 processes the cancel close command, as further described below with reference to FIG. 7. Control then continues to block 698 where the logic of FIG. 6 returns.

If the determination of block 630 is false, then the cancel close command was not received before expiration of the timer, so control continues from block 630 to block 640 where the window controller 160 closes the window. Control then continues to block 699 where the logic of FIG. 6 returns.

If the determination of block 615 is false, then the close window command was not received within the close threshold time 520 of the window opening, activation, or display, so control continues from block 615 to block 645 where the window controller 160 determines whether the resize count 535 exceeds the resize threshold 530. If the determination of block 645 is true, then the resize count 535 does exceed the resize threshold 530, so control continues to block 620, as previously described above.

If the determination of block 645 is false, then the resize count 535 does not exceed the resize threshold 530, so control continues from block 645 to block 647 where the window controller 160 sets a timer to the value of the cancel-close low threshold 555. The window controller 160 uses the cancel-close low threshold 555 (as opposed to the cancel-close high threshold 550) at block 647 to give the user a shorter amount of time to send the cancel command because the likelihood is lower at this point that the cancel command will be received since the close was not received within the close threshold 520 and the resize count 535 does not exceed the resize threshold 530. Control then continues to block 620, as previously described above.

If the determination of block 610 is false, then a close window command was not received, so control continues from block 610 to block 650 where the window controller 160 processes other commands, as further described below with reference to FIG. 8. Control then continues to block 699 where the logic of FIG. 6 returns.

Figure 7:
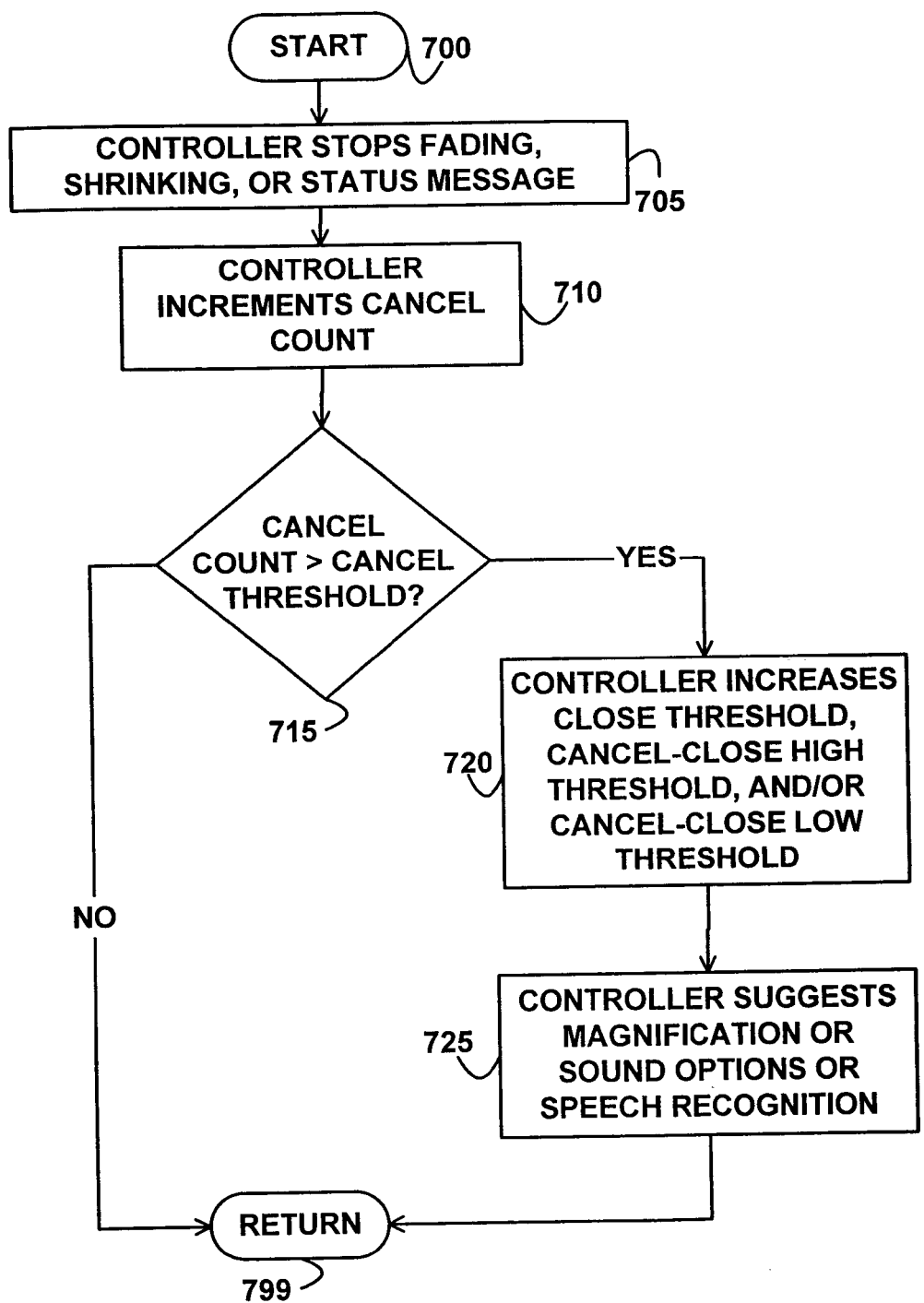
FIG. 7 depicts a flowchart of example processing for a cancel close command, according to an embodiment of the invention.

FIG. 7 depicts a flowchart of example processing for a cancel close command, according to an embodiment of the invention. Control begins at block 700. Control then continues to block 705 where the window controller 160 stops the fading of the window, the shrinking of the window, or the display of the status message 320. Control then continues to block 710 where the window controller 160 increments the cancel count 545. Control then continues to block 715 where the window controller 160 determines whether the cancel count 545 is greater than the cancel threshold 540. If the determination of block 715 is true, then the cancel count 545 is greater than the cancel threshold 540, so control continues to block 720 where the window controller 160 increases any or all of the close threshold 520, the cancel-close high threshold 550, or the cancel-close low threshold 555. Control then continues to block 725 where the window controller 160 optionally suggests magnification options, sound options, and/or speech recognition. Increasing the magnification size may enable the user to better see which command is being selected, which icon is being selected, or to which window the command is directed. Examples of sound options include increasing the sound volume or changing the sound effect or tone associated with a window opening, which may enable the user to notice the opening window and thus better direct commands to windows. Using speech recognition instead of typing may enable the user to pay more attention to the display screen and less attention to the keyboard, which may enable the user to better select the window to which commands are directed. Control then continues to block 799 where the logic of FIG. 7 returns.

If the determination of block 715 is false, then the cancel count 545 does not exceed the cancel threshold 540, so control continues from block 715 to block 799 where the logic of FIG. 7 returns.

Figure 8:
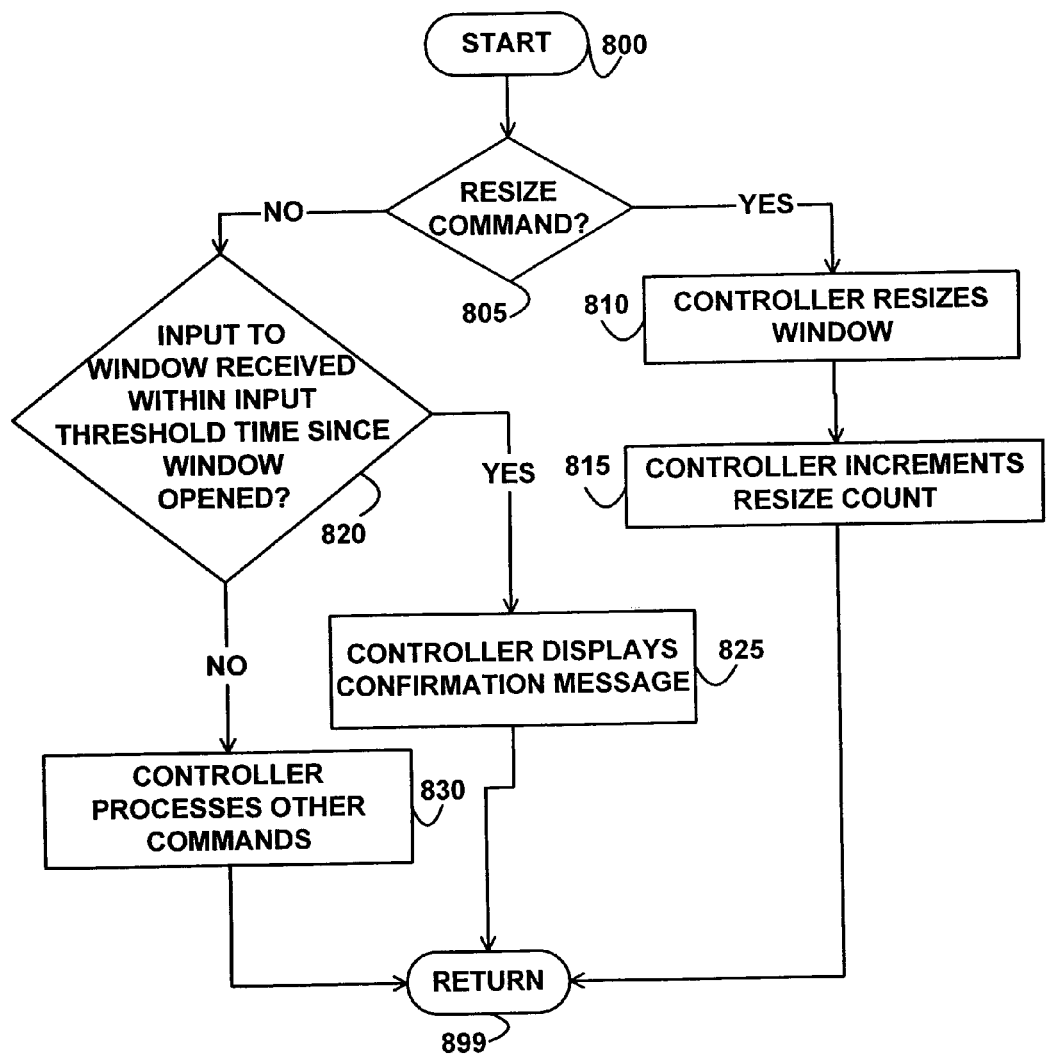
FIG. 8 depicts a flowchart of example processing for a resize command and input to a window, according to an embodiment of the invention.

FIG. 8 depicts a flowchart of example processing for a resize command and input to a window, according to an embodiment of the invention. Control begins at block 800. Control then continues to block 805 where the window controller 160 determines whether a resize command has been received. If the determination of block 805 is true, then the resize window command has been received, so control continues to block 810 where the window controller 160 resizes the window. Control then continues to block 815 where the window controller 160 increments the resize count 535. Control then continues to block 899 where the logic of FIG. 8 returns.

If the determination of block 805 is false, then a resize command has not been received, so control continues from block 805 to block 820 where the window controller 160 determines whether input to the window was received within the input threshold time 525 since the window was opened.

If the determination of block 820 is true, then input to the window was received within the input threshold time 525 since the window was opened, so control continues from block 820 to block 825 where the window controller 160 displays the input confirmation message 420 (FIG. 4). Control then continues to block 899 where the logic of FIG. 8 returns.

If the determination at block 820 is false, then input to the window was not received within the input threshold time 525 since the window was opened, so control continues to block 830 where the window controller 160 processes other commands. Control then continues to block 899 where the logic of FIG. 8 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving a close command directed to a window from a user interface;
   determining whether the close command was received from the user interface within a close threshold time of display of the window, wherein the close threshold time indicates a threshold amount of time following opening of the window, wherein the close threshold time for the window is different than a close threshold time for another window;
   if the close command was not received from the user interface within the close threshold time of the display of the window, deciding whether a number of times the window has been resized via the user interface is greater than a resize threshold for the window, wherein the deciding further comprises deciding whether the number of times the window has had its horizontal and vertical dimensions changed via the user interface is greater than the resize threshold, wherein the resize threshold for the window is different than a resize threshold for the another window;

if the close command was not received from the user interface within the close threshold time of the display of the window and the number of times the window has had its horizontal and vertical dimensions changed via the user interface is greater than the resize threshold for the window, setting a timer to a cancel-close high threshold for the window, wherein the cancel-close high threshold for the window is different than a cancel-close high threshold for the another window;

if the close command was not received from the user interface within the close threshold time of the display of the window and the number of times the window has had its horizontal and vertical dimensions changed via the user interface is not greater than the resize threshold for the window, setting the timer to a cancel-close low threshold for the window, wherein the cancel-close slow threshold for the window is different than a cancel-close low threshold for the another window, wherein the cancel-close high threshold for the window is a longer time period than the cancel-close low threshold for the window;

displaying a cancel dialog via the user interface, wherein the cancel dialog allows a request from the user interface to cancel the close command;

if the close command was received from the user interface within the close threshold time of the display of the window, setting the timer to the cancel-close high threshold for the window;

determining whether a cancel close command is received from the user interface before expiration of the timer;

if the cancel close command is not received from the user interface before expiration of the timer, closing the window;

if the cancel close command is received from the user interface before expiration of the timer, canceling the closing of the window;

if the cancel close command is received from the user interface before expiration of the timer, determining whether a number of times the cancel command is received for the window exceeds a cancel threshold for the window, wherein the cancel threshold for the window is different than a cancel threshold for the another window;

if the number of times the cancel close command is received from the user interface exceeds the cancel threshold for the window, increasing the close threshold for the window, the cancel-close high threshold for the window, and the cancel-close low threshold for the window;

determining whether input to the window has been received within an input threshold time for the window since the window was opened, wherein the input threshold time for the window is different than an input threshold time for the another window; and displaying a confirmation message if the input to the window has been received within an input threshold time for the window since the window was opened.

2. The method of claim 1, further comprising:
if the number of times the window has had its horizontal and vertical dimensions changed via the user interface is greater than the resize threshold for the window, fading the window; and
if the cancel close command, is received from the user interface before expiration of the timer, stopping the fading of the window.

3. The method of claim 1, further comprising:
if the number of times the window has had its horizontal and vertical dimensions changed via the user interface is greater than the resize threshold for the window, shrinking the window; and
if the cancel close command is received from the user interface before expiration of the timer, stopping the shrinking of the window.

4. The method of claim 1, further comprising:
in response to the receiving the close command directed to the window from the user interface, displaying a status message, wherein the status message indicates that the window is closing.

5. The method of claim 1, further comprising:
recommending magnification if the number of times the cancel command is received for the window exceeds the cancel threshold for the window.

6. The method of claim 1, further comprising:
recommending a sound option if the number of times the cancel command is received for the window exceeds the cancel threshold for the window.

7. The method of claim 1, further comprising:
recommending a speech recognition function if the number of times the cancel command is received for the window exceeds the cancel threshold for the window.

8. A storage medium encoded with instructions, wherein the instructions when executed comprise:
receiving a close command directed to a window front a user interface;
determining whether the close command was received from the user interface within a close threshold time of display of the window, wherein the close threshold time indicates a threshold amount of time following opening of the window, wherein the close threshold time for the window is different than a close threshold time for another window;
if the close command was not received from the user interface within the close threshold time of the display of the window, deciding whether a number of times the window has been resized via the user interface is greater than a resize threshold for the window, wherein the deciding further comprises deciding whether the number of times the window has had its horizontal and vertical dimensions changed via the user interface is greater than the resize threshold, wherein the resize threshold for the window is different than a resize threshold for the another window;
if the close command was not received from the user interface within the close threshold time of the display of the window and the number of times the window has had its horizontal and vertical dimensions changed via the user interface is greater than the resize threshold for the window, setting a timer to a cancel-close high threshold for the window, wherein the cancel-close high threshold for the window is different than a cancel-close high threshold for the another window;
if the close command was not received from the user interface within the close threshold time of the display of the window and the number of times the window has had its horizontal and vertical dimensions changed via the user interface is not greater than the resize threshold for the window, setting the timer to a cancel-close low threshold for the window, wherein the cancel-close slow threshold for the window is different than a cancel-close low threshold for the another window, wherein the cancel-close high threshold for the window is a longer time period than the cancel-close low threshold for the window;

displaying a cancel dialog via the user interface, wherein the cancel dialog allows a request from the user interface to cancel the close command;

if the close command was received from the user interface within the close threshold time of the display of the window, setting the timer to the cancel-close high threshold for the window;

determining whether a cancel close command is received from the user interface before expiration of the timer;

if the cancel close command is not received from the user interface before expiration of the timer, closing the window;

if the cancel close command is received from the user interface before expiration of the timer, canceling the closing of the window;

if the cancel close command is received from the user interface before expiration of the timer, determining whether a number of times the cancel command is received for the window exceeds a cancel threshold for the window, wherein the cancel threshold for the window is different than a cancel threshold for the another window;

if the number of times the cancel close command is received from the user interface exceeds the cancel threshold for the window, increasing the close threshold for the window, the cancel-close high threshold for the window, and the cancel-close low threshold for the window;

determining whether input to the window has been received within an input threshold time for the window since the window was opened, wherein the input threshold time for the window is different than an input threshold time for the another window; and displaying a confirmation message if the input to the window has been received within an input threshold time for the window since the window was opened.

9. The storage medium of claim 8, further comprising:
if the number of times the window has had its horizontal and vertical dimensions changed via the user interface is greater than the resize threshold for the window, fading the window; and
if the cancel close command is received from the user interface before expiration of the timer, stopping the fading of the window.

10. The storage medium of claim 8, further comprising:
if the number of times the window has had its horizontal and vertical dimensions changed via the user interface is greater than the resize threshold for the window, shrinking the window; and
if the cancel close command is received from the user interface before expiration of the timer, stopping the shrinking of the window.

11. The storage medium of claim 8, further comprising:
in response to the receiving the close command directed to the window from the user interface, displaying a status message, wherein the status message indicates that the window is closing.

12. The storage medium of claim 8, further comprising:
recommending magnification if the number of times the cancel command is received for the window exceeds the cancel threshold for the window.

13. A method for configuring a computer, comprising:
configuring the computer to receive a close command directed to a window from a user interface;
configuring the computer to determine whether the close command was received from the user interface within a close threshold time of display of the window, wherein the close threshold time indicates a threshold amount of time following opening of the window, wherein the close threshold time for the window is different than a close threshold time for another window;
configuring the computer to, if the close command was not received from the user interface within the close threshold time of the display of the window, decide whether a number of times the window has been resized via the user interface is greater than a resize threshold for the window, wherein the configuring the computer to, if the close command was not received from the user interface within the close threshold time of the display of the window, decide further comprises configuring the computer to decide whether the number of times the window has had its horizontal and vertical dimensions changed via the user interface is greater than the resize threshold, wherein the resize threshold for the window is different than a resize threshold for the another window;
configuring the computer to, if the close command was not received from the user interface within the close threshold time of the display of the window and the number of times the window has had its horizontal and vertical dimensions changed via the user interface is greater than the resize threshold for the window, set a timer to a cancel-close high threshold for the window, wherein the cancel-close high threshold for the window is different than a cancel-close high threshold for the another window;
configuring the computer to, if the close command was not received from the user interface within the close threshold time of the display of the window and the number of times the window has had its horizontal and vertical dimensions changed via the user interface is not greater than the resize threshold for the window, set the timer to a cancel-close low threshold for the window, wherein the cancel-close slow threshold for the window is different than a cancel-close low threshold for the another window, wherein the cancel-close high threshold for the window is a longer time period than the cancel-close low threshold for the window;
configuring the computer to display a cancel dialog via the user interface, wherein the cancel dialog allows a request from the user interface to cancel the close command;
configuring the computer to, if the close command was received from the user interface within the close threshold time of the display of the window, set the timer to the cancel-close high threshold for the window;
configuring the computer to determine whether a cancel close command is received from the user interface before expiration of the timer;
configuring the computer to, if the cancel close command is not received from the user interface before expiration of the timer, close the window;
configuring the computer to, if the cancel close command is received from the user interface before expiration of the timer, cancel the close of the window;

configuring the computer to, if the cancel close command is received from the user interface before expiration of the timer, determine whether a number of times the cancel command is received for the window exceeds a cancel threshold for the window, wherein the cancel threshold for the window is different than a cancel threshold for the another window;

configuring the computer to, if the number of times the cancel close command is received from the user interface exceeds the cancel threshold for the window, increase the close threshold for the window, the cancel-close high threshold for the window, and the cancel-close low threshold for the window;

configuring the computer to determine whether input to the window has been received within an input threshold time for the window since the window was opened, wherein the input threshold time for the window is different than an input threshold time for the another window; and configuring the computer to display a confirmation message if the input to the window has been received within an input threshold time for the window since the window was opened.

14. The method of claim 13, further comprising:

configuring the computer to, if the number of times the window has had its horizontal and vertical dimensions changed via the user interface is greater than the resize threshold for the window, fade the window; and configuring the computer to, if the cancel close command is received from the user interface before expiration of the timer, stop the fade of the window.

15. The method of claim 13, further comprising:

configuring the computer to, if the number of times the window has had its horizontal and vertical dimensions changed via the user interface is greater than the resize threshold for the window, shrink the window; and configuring the computer to, if the cancel close command is received from the user interface before expiration of the timer, stop the shrink of the window.

16. The method of claim 13, further comprising:

configuring the computer to, in response to the receive of the close command directed to the window from the user interface, display a status message, wherein the status message indicates that the window is closing.

17. The method of claim 13, further comprising:

configuring the computer to recommend magnification if the number of times the cancel command is received for the window exceeds the cancel threshold for the window.

* * * * *